(12) United States Patent
Yeh et al.

(10) Patent No.: US 11,774,239 B1
(45) Date of Patent: Oct. 3, 2023

(54) OPTICAL MEASUREMENT DEVICE AND CALIBRATION METHOD THEREOF

(71) Applicants: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)

(72) Inventors: Chao-Yi Yeh, Guangdong (CN); Jiangyun Zhou, Guangdong (CN); Siqi Wang, Guangdong (CN); Ya-Chu Yang, Guangdong (CN)

(73) Assignees: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)

( * ) Notice: Subject to any disclaimer, the term of this patent is extended or adjusted under 35 U.S.C. 154(b) by 35 days.

(21) Appl. No.: 17/662,842

(22) Filed: May 10, 2022

(30) Foreign Application Priority Data

Mar. 25, 2022 (CN) .......................... 202210299913.2

(51) Int. Cl.
*G01B 11/26* (2006.01)
*G01B 11/06* (2006.01)
*G01N 21/41* (2006.01)
*G01N 21/43* (2006.01)

(52) U.S. Cl.
CPC .............. *G01B 11/26* (2013.01); *G01B 11/06* (2013.01); *G01N 21/41* (2013.01); *G01N 21/43* (2013.01)

(58) Field of Classification Search
CPC ........ G01B 11/26; G01B 11/06; G01N 21/41; G01N 21/43
See application file for complete search history.

(56) References Cited

U.S. PATENT DOCUMENTS

| | | | | |
|---|---|---|---|---|
| 2002/0030823 | A1* | 3/2002 | Kobayashi | G01B 11/06 356/485 |
| 2018/0087898 | A1* | 3/2018 | Akagi | G01N 21/86 |
| 2019/0101492 | A1* | 4/2019 | Nakamura | G01B 11/26 |
| 2022/0005715 | A1* | 1/2022 | Lee | G01N 21/9501 |

FOREIGN PATENT DOCUMENTS

CN 111239164 A * 6/2020 ......... G01N 21/8806

* cited by examiner

*Primary Examiner* — Tarifur R Chowdhury
*Assistant Examiner* — Carlos Perez-Guzman
(74) *Attorney, Agent, or Firm* — CKC & Partners Co., LLC

(57) ABSTRACT

A method includes: transmitting an incident light to an object located on a stage, in which a first light and a second light are reflected; receiving the first light and the second light by an imaging lens group to obtain a third pattern corresponding to the first pattern and a fourth pattern corresponding to the second pattern; transmitting the third pattern and the fourth pattern to an image sensor, in which a center point of the third pattern and a center point of the fourth pattern are separated by a first distance on the image sensor; calculating a tilted angle between an optical axis of the imaging lens group and a normal direction of the stage according to the first distance; and adjusting the stage according to the tilted angle such that the normal direction is parallel to the optical axis.

19 Claims, 8 Drawing Sheets

OPTICAL MEASUREMENT DEVICE AND CALIBRATION METHOD THEREOF

RELATED APPLICATION

This application claims priority to China Application Serial Number 202210299913.2, filed Mar. 25, 2022, which is herein incorporated by reference in its entirety.

BACKGROUND

Field of Invention

The present disclosure relates to an optical measurement device and a calibration method of the optical measurement device.

Description of Related Art

In general, it may be necessary to calibrate the positions of an optical measurement device and a stage for measurement accuracy when the optical measurement device may be used to measure an object on the stage (such as an area, a length, or an appearance defect size of the object). A conventional method may dispose a level on the stage and adjust screws around the stage to make sure the stage is parallel to the ground. However, this conventional method does not calibrate the positions of the optical measuring device and the stage, so we have no idea whether an optical axis of the imaging lens group is parallel to the normal direction of the stage. In addition, when the measured size is on the order of microns, it requires very high measurement accuracy. A slight position shift will cause errors in the measurement results. So, it is necessary to calibrate the imaging lens group to make sure the optical axis is parallel to the normal direction of the stage.

SUMMARY

An aspect of the present disclosure is related to a calibration method of an optical measurement device.

According to one embodiment of the present disclosure, a calibration method of an optical measurement device includes: disposing an object on a stage, wherein the object has a top surface and a bottom surface opposite to the top surface, the top surface has a first pattern, and the bottom surface has a second pattern; emitting an incident light to the object on the stage, wherein a first light is reflected after the incident light passes through the first pattern, and a second light is reflected after the incident light passes through the second pattern; receiving the first light and the second light by an imaging lens group to obtain a third pattern corresponding to the first pattern and a fourth pattern corresponding to the second pattern; transmitting the third pattern and the fourth pattern to an image sensor by the imaging lens group, wherein a center point of the third pattern and a center point of the fourth pattern are separated by a first distance on the image sensor; calculating a tilted angle between an optical axis of the imaging lens group and a normal direction of the stage according to the first distance; and adjusting the stage according to the tilted angle such that the normal direction of the stage is parallel to the optical axis of the imaging lens group.

In one embodiment of the present disclosure, the method further includes calculating the tilted angle according to a thickness between the top surface and the bottom surface of the object.

In one embodiment of the present disclosure, the method further includes calculating the tilted angle according a refractive index of the object.

In one embodiment of the present disclosure, the method further includes calculating the tilted angle according to a magnification of the imaging lens group.

In one embodiment of the present disclosure, the method further includes calculating a second distance between the first light and the second light according to the first distance, the tilted angle and the magnification.

In one embodiment of the present disclosure, emitting the incident light to the object on the stage further includes: emitting the incident light to a beam splitter of the imaging lens group by a coaxial light source; and reflecting the incident light to the object on the stage by the beam splitter.

In one embodiment of the present disclosure, the method further includes determining a first direction from the third pattern to the fourth pattern on the image sensor.

In one embodiment of the present disclosure, the method further includes moving the stage along a second direction, wherein the second direction is opposite to the first direction.

Another aspect of the present disclosure is related to an optical measurement device.

According to one embodiment of the present disclosure, an optical measurement device includes a stage, an object, a coaxial light source, a imaging lens group, an image sensor and a calculation unit. The object is disposed on the stage. The object has a top surface and a bottom surface opposite to the top surface. The top surface has a first pattern. The bottom surface has a second pattern. The coaxial light source is configured to emit an incident light to the object on the stage. The imaging lens group is located at one side of the coaxial light source. The imaging lens group is configured to receive a first light reflected by the first pattern and a second light reflected by the second pattern from the incident light to obtain a third pattern corresponding to the first pattern and a fourth pattern corresponding to the second pattern. The image sensor is located at one side of the imaging lens group facing away from the stage. The image sensor is configured to receive the third pattern and the fourth pattern. A center point of the third pattern and a center point of the fourth pattern are separated by a first distance on the image sensor. The calculation unit electrically is connected to the stage. The calculation unit electrically is configured to calculate a tilted angle between an optical axis of the imaging lens group and a normal direction of the stage according to the first distance and adjust the stage according to the tilted angle such that the normal direction of the stage is parallel to the optical axis of the imaging lens group.

In one embodiment of the present disclosure, the imaging lens group has a beam splitter, and the beam splitter is located between the image sensor and the object.

In one embodiment of the present disclosure, the beam splitter is configured to reflect the incident light to the object on the stage.

In one embodiment of the present disclosure, the object is located between the stage and the imaging lens group.

In one embodiment of the present disclosure, the object has a thickness between the top surface and the bottom surface. The calculation unit is further configured to calculate the tilted angle between the optical axis of the imaging lens group and the normal direction of the stage according to the thickness.

In one embodiment of the present disclosure, the object has a refractive index. The calculation unit is further configured to calculate the tilted angle between the optical axis of the imaging lens group and the normal direction of the stage according to the refractive index of the object.

In one embodiment of the present disclosure, the imaging lens group has a magnification. The calculation unit is further configured to calculate the tilted angle between the optical axis of the imaging lens group and the normal direction of the stage according to the magnification of the imaging lens group.

In one embodiment of the present disclosure, the calculation unit is further configured to calculate a second distance between the first light and the second light according to the first distance, the tilted angle and the magnification.

In one embodiment of the present disclosure, the calculation unit is further configured to determine a first direction from the third pattern to the fourth pattern on the image sensor.

In one embodiment of the present disclosure, the stage is further configured to move along a second direction opposite to the first direction.

In one embodiment of the present disclosure, an included angle between the incident light and the first light is twice the tilted angle.

In the embodiments of the present disclosure, the optical measurement device may calculate the tilted angle between the optical axis of the imaging lens group and the normal direction of the stage according to the first distance. Moreover, the optical measurement device may adjust the stage according to the tilted angle. Therefore, the normal direction of the stage of the optical measurement device may be corrected to be parallel to the optical axis of the imaging lens group, which may improve the measurement accuracy of the optical measurement device for measuring the object. The optical measurement device may be used in micron-level measurement systems that require high measurement accuracy.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
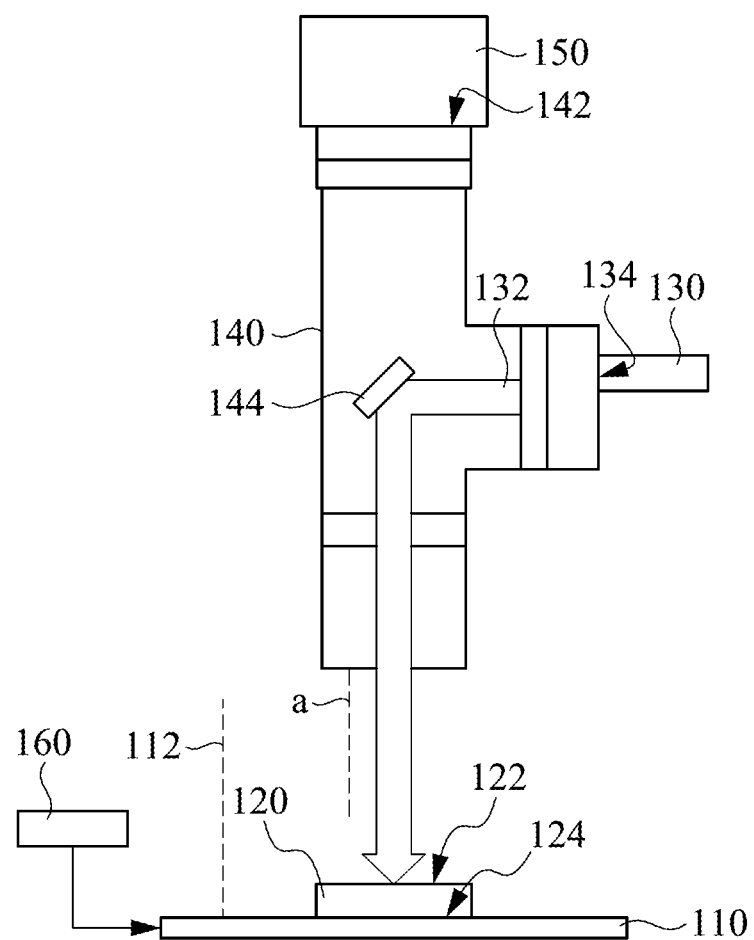
FIG. 1 illustrates a schematic view of an optical measurement device according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
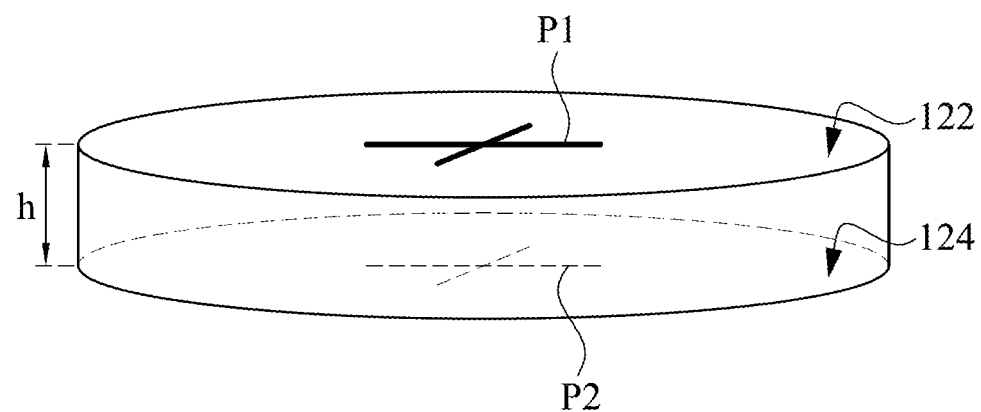
FIG. 2 illustrates a stereoscopic view of an object according to one embodiment of the present disclosure.

FIG. 1 illustrates a schematic view of an optical measurement device 100 according to one embodiment of the present disclosure. FIG. 2 illustrates a stereoscopic view of an object 120 according to one embodiment of the present disclosure. Referring to both FIG. 1 and FIG. 2, the optical measurement device 100 includes a stage 110, the object 120, a coaxial light source 130, an imaging lens group 140, an image sensor 150 and a calculation unit 160. The object 120 is disposed on stage 110. For example, the object 120 may be a flat glass certified by the National Measurement Center, but it is not limited in this regard. The object 120 has a top surface 122 and a bottom surface 124 opposite to top surface 122. The top surface 122 of the object 120 may be parallel to the bottom surface 124, and the top surface 122 has a first pattern P1. The bottom surface 124 of the object 120 has a second pattern P2. The first pattern P1 and the second pattern P2 may have high reflection characteristics to reflect light (it will be described in detail below). The coaxial light source 130 is configured to emit incident light 132 to object 120 on stage 110. For example, the coaxial light source 130 may provide the more uniform incident light 132 to avoid reflection of the object 120, thereby improving an image capturing accuracy of the imaging lens group 140.

Figure 3:
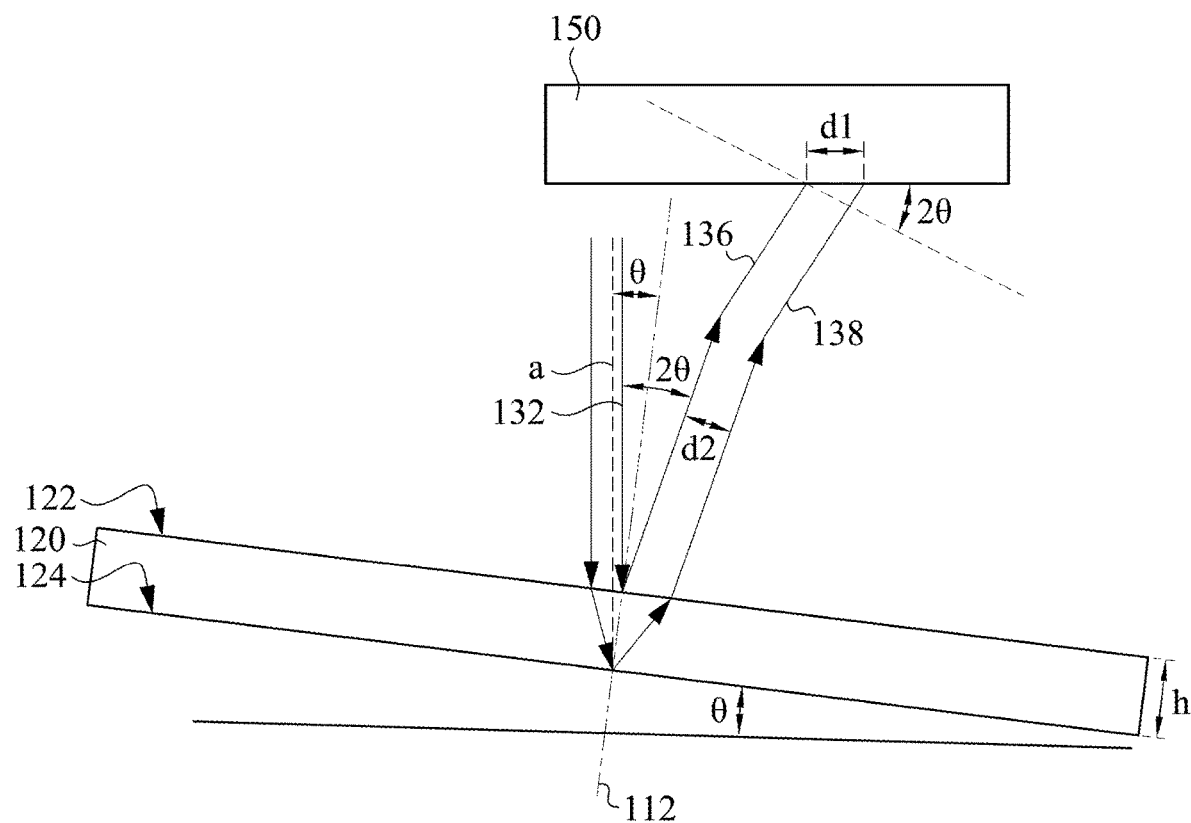
FIG. 3 illustrates a schematic view of a tilted angle between an optical axis of an imaging lens group and a normal direction of an object according to one embodiment of the present disclosure.

FIG. 3 illustrates a schematic view of a tilted angle θ between an optical axis a of the imaging lens group 140 and a normal direction 112 of the object 120 according to one embodiment of the present disclosure. In order to explain the tilted angle θ in detail, the stage 110, the coaxial light source 130 and the imaging lens group 140 in FIG. 1 are omitted here. Referring to FIG. 1 to FIG. 3, the imaging lens group 140 is located at one side 142 of the coaxial light source 130. Since the object 120 is disposed horizontally on the stage 110, the normal direction 112 of the object 120 is the same as the stage 110. When the stage 110 has the tilted angle θ with respect to the optical axis a of the imaging lens group 140, the object 120 disposed on the stage 110 also has the same tilted angle θ with respect to the optical axis a of the imaging lens group 140. The imaging lens group 140 is configured to receive a first light 136 reflected by the first pattern P1 and a second light 138 reflected by the second pattern P2 from the incident light 132. That is, when the incident light 132 is incident on the object 120 having the tilted angle θ, an included angle between the first light 136 and the incident light 132 is twice the tilted angle θ(ie, 2θ).

Figure 4:
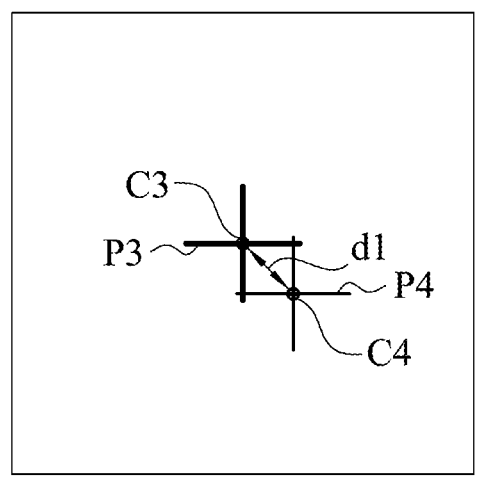
FIG. 4 illustrates a schematic view of a third pattern and a fourth pattern on an image sensor according to one embodiment of the present disclosure.

FIG. 4 illustrates a schematic view of a third pattern P3 and a fourth pattern P4 on the image sensor 150 according to one embodiment of the present disclosure. Referring to FIG. 1 to FIG. 4, the imaging lens group 140 is configured to obtain the third pattern P3 corresponding to the first pattern P1 and the fourth pattern P4 corresponding to the second pattern P2. The image sensor 150 is located at one side 142 of the imaging lens group 140 facing away from the stage 110. The image sensor 150 is configured to receive the third pattern P3 and the fourth pattern P4. When the incident light 132 is incident on the object 120 having the tilted angle θ, a center point C3 of the third pattern P3 and a center point C4 of the fourth pattern P4 are separated by a first distance d1 on the image sensor 150. The calculation unit 160 is electrically connected to the stage 110. The calculation unit 160 is configured to calculate the tilted angle θ between the optical axis a of the imaging lens group 140 and the normal direction 112 of the stage 110 according to the first distance d1. The calculation unit 160 is configured to adjust the stage 110 according to the tilted angle θ such that the normal direction 112 is parallel to the optical axis a of the imaging lens group 140, as shown in FIG. 1.

Specifically, the calculation unit 160 of the optical measurement device 100 may calculate the tilted angle θ between the optical axis a of the imaging lens group 140 and the normal direction 112 of the stage 110 according to the first distance d1. Moreover, the optical measurement device 100 may adjust the stage 110 according to the tilted angle θ. Therefore, the normal direction 112 of the stage 110 of the optical measurement device 100 may be corrected to be parallel to the optical axis a of the imaging lens group 140, which may improve the measurement accuracy of the optical measurement device 100 for measuring the object 120. The optical measurement device 100 may be used in micron-level measurement systems that require high measurement accuracy.

In some embodiments, the imaging lens group 140 has a beam splitter 144. The beam splitter 144 is located between the image sensor 150 and the object 120. The beam splitter 144 of the imaging lens group 140 is configured to reflect the incident light 132 to the object 120 on the stage 110. For example, the beam splitter 144 may be made of optical coating, but it is not limited in this regard.

In some embodiments, the object 120 is located between the stage 110 and the imaging lens group 140. The object 120 has a thickness h between the top surface 122 and the bottom surface 124. The calculation unit 160 is further configured to calculate the tilted angle θ between the optical axis a of the imaging lens group 140 and the normal direction 112 of the stage 110 according to the thickness h. In addition, the object 120 has a refractive index, and the calculation unit 160 is further configured to calculate the tilted angle θ between the optical axis a of the imaging lens group 140 and the normal direction 112 of the stage 110 according to the refractive index of the object 120. The imaging lens group 140 has a magnification, and the calculation unit 160 is further configured to calculate the tilted angle θ between the optical axis a of the imaging lens group 140 and the normal direction 112 of the stage 110 according to the magnification of the imaging lens group 140. In detail, the refractive index of the object 120 may be n, and the magnification of the imaging lens group 140 may be M, and the formula of the tilted angle θ, the magnification M, the thickness h, the refractive index n and the first distance d1 may be:

$$\frac{M^2 h^2}{4d1^2} \times \frac{1}{\cos^2 2\theta} - \frac{\cos 2\theta}{2} = n^2 + \frac{M^2 h^2}{4d1^2} - \frac{1}{2}.$$

That is, if the magnification M, the thickness h, the refractive index n and the first distance d1 are known, the calculation unit 160 may obtain the tilted angle θ through the numerical analysis method (the above formula). In this way, the stage 110 may be adjusted according to the tilted angle θ such that the normal direction 112 of the stage 110 of the optical measuring device 100 is parallel to the optical axis a of the imaging lens group 140, so as to improve the measurement accuracy of the optical measuring device 100.

In some embodiments, after the incident light 132 incident on the first pattern P1 and the second pattern P2 is reflected, the first light 136 and the second light 138 are separated by a second distance d2. The calculation unit 160 is further configured to calculate the second distance d2 between the first light 136 and the second light 138 according to the first distance d1, the tilted angle θ and the magnification M. In detail, a formula may be: d2=d1×cos 2θ/M. Therefore, if the magnification M, the first distance d1 and the tilt angle θ are known, the calculation unit 160 may obtain the second distance d2. In addition, a formula may be:

$$d2 = h \times \frac{\sin\theta\cos\theta}{\sqrt{n^2 - \sin^2\theta}}.$$

Therefore, it me thickness h, the refractive index n and the tilted angle θ are known, the calculation unit 160 may obtain the second distance d2.

It is to be noted that the connection relationship of the aforementioned elements will not be repeated. In the following description, a calibration method of an optical measurement device will be described.

Figure 5:
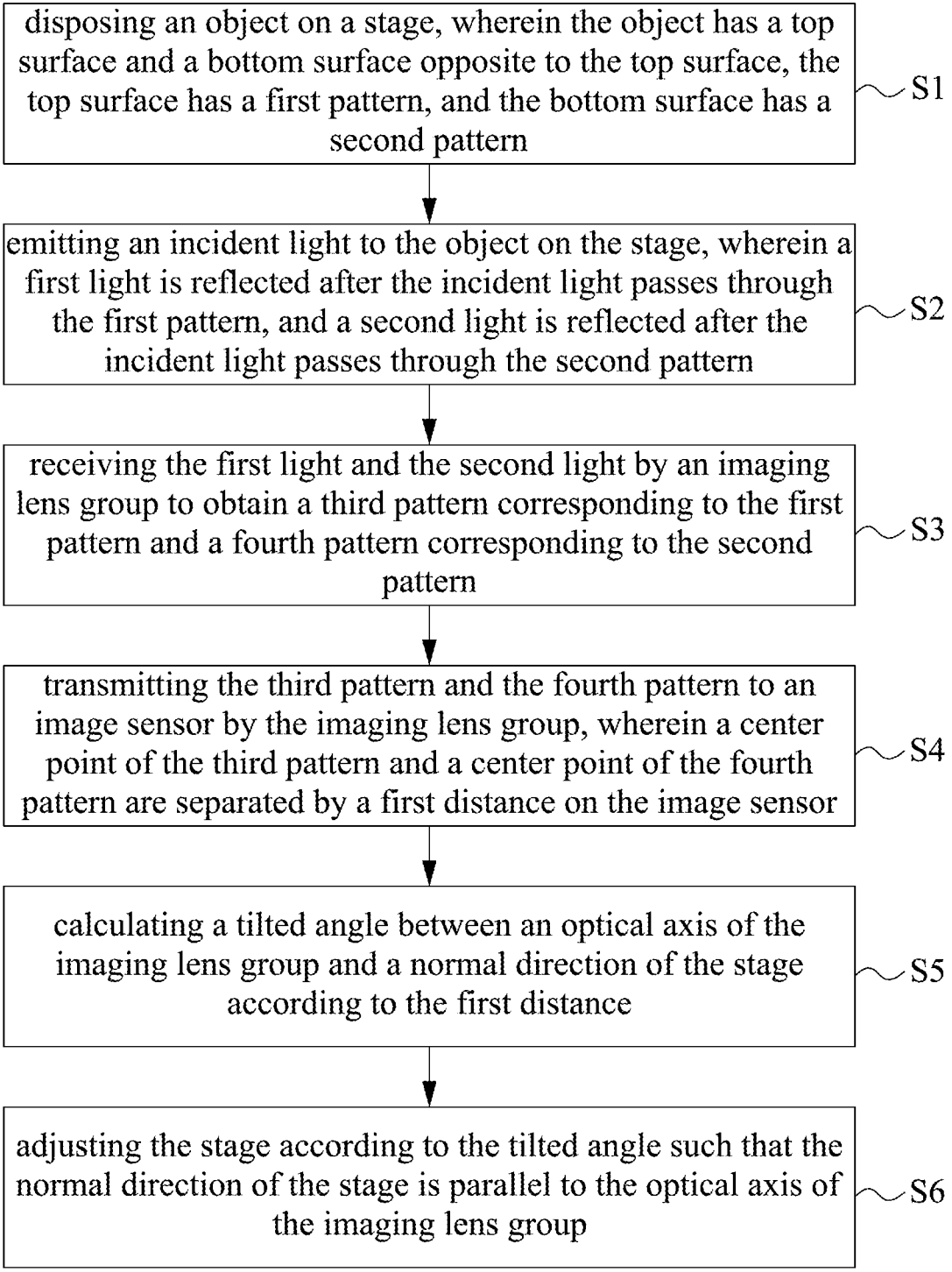
FIG. 5 illustrates a flow chart of a calibration method of an optical measurement device according to one embodiment of the present disclosure.

FIG. 5 illustrates a flow chart of a calibration method of an optical measurement device according to one embodiment of the present disclosure. The calibration method of the optical measurement device includes steps as outlined below. In step S1, an object is disposed on a stage, wherein the object has a top surface and a bottom surface opposite to the top surface, the top surface has a first pattern, and the bottom surface has a second pattern. In step S2, an incident light is emitted to the object on the stage, wherein a first light is reflected after the incident light passes through the first pattern, and a second light is reflected after the incident light passes through the second pattern. In step S3, the first light and the second light are received by an imaging lens group to obtain a third pattern corresponding to the first pattern and a fourth pattern corresponding to the second pattern. In step S4, the third pattern and the fourth pattern are transmitted to an image sensor by the imaging lens group, wherein a center point of the third pattern and a center point of the fourth pattern are separated by a first distance on the image sensor. In step S5, a tilted angle between an optical axis of the imaging lens group and a normal direction of the stage is calculated according to the first distance. In step S6, the stage is adjusted according to the tilted angle such that the normal direction of the stage is parallel to the optical axis of the imaging lens group. In the following description, the aforementioned steps will be described in detail.

Referring to both FIG. 1 and FIG. 2, first, the object 120 is disposed on the stage 110, wherein the object 120 has the top surface 122 and the bottom surface 124 opposite to the top surface 122. The top surface 122 of the object 120 has the first pattern P1. The bottom surface 124 of the object 120 has the second pattern P2. The first pattern P1 and the second pattern P2 may have high reflection characteristics.

Referring to FIG. 1 to FIG. 3, next, the incident light 132 is emitted to the object 120 on the stage 110. The first light 136 is reflected after the incident light 132 passes through the first pattern P1. The second light 138 is reflected after the incident light 132 passes through the second pattern P2. When the incident light 132 is incident on the object 120 having the tilted angle θ, the included angle between the first light 136 and the incident light 132 is twice the tilted angle θ(ie, 2θ).

Referring to FIG. 1 to FIG. 4, next, the first light 136 and the second light 138 are received by the imaging lens group 140 to obtain the third pattern P3 corresponding to the first pattern P1 and the fourth pattern P4 corresponding to the second pattern P2. Next, the third pattern P3 and the fourth pattern P4 are transmitted to the image sensor 150 by the imaging lens group 140. When the incident light 132 is incident on the object 120 having the tilted angle θ, the center point C3 of the third pattern P3 and the center point C4 of the fourth pattern P4 are separated by the first distance d1 on the image sensor 150.

Next, the tilted angle θ between the optical axis a of the imaging lens group 140 and the normal direction 112 of the stage 110 is calculated according to the first distance d1, and the stage 110 is adjusted according to the tilted angle θ such that the normal direction 112 is parallel to the optical axis a of the imaging lens group 140, as shown in FIG. 1.

In some embodiments, calculating the tilted angle θ between the optical axis a of the imaging lens group 140 and the normal direction 112 of the stage 110 according to the first distance d1 further includes calculating the tilted angle θ according to the thickness h between the top surface 122 and the bottom surface 124 of the object 120. Calculating the tilted angle θ between the optical axis of the imaging lens group 140 and the normal direction 112 of the stage 110 according to the first distance d1 further includes calculating the tilted angle θ according to the refractive index of the object 120. Calculating the tilted angle θ between the optical axis a of the imaging lens group 140 and the normal direction 112 of the stage 110 according to the first distance d1 further includes calculating the tilted angle θ according to the magnification of the imaging lens group 140. In detail, the refractive index of the object 120 may be n, and the magnification of the imaging lens group 140 may be M, and the formula of the tilted angle θ, the magnification M, the thickness h, the refractive index n and the first distance d1 may be:

$$\frac{M^2 h^2}{4d1^2} \times \frac{1}{\cos^2 2\theta} - \frac{\cos 2\theta}{2} = n^2 + \frac{M^2 h^2}{4d1^2} - \frac{1}{2}.$$

That is, if the magnification M, the thickness h, the refractive index n and the first distance d1 are known, the calculation unit 160 may obtain the tilted angle θ through the numerical analysis method (the above formula). In this way, the stage 110 may be adjusted according to the tilted angle θ such that the normal direction 112 of the stage 110 of the optical measuring device 100 is parallel to the optical axis a of the imaging lens group 140, so as to improve the measurement accuracy of the optical measuring device 100.

In some embodiments, the calibration method further includes calculating the second distance d2 between the first light 136 and the second light 138 according to the first distance d1, the tilted angle θ and the magnification. In detail, a formula may be: d2=d1×cos 2θ/M. Therefore, if the magnification M, the first distance d1 and the tilt angle θ are known, the calculation unit 160 may obtain the second distance d2. In some embodiments, transmitting the incident light 132 to the object 120 on the stage 110 further includes: transmitting the incident light 132 to the beam splitter 144 of the imaging lens group 140 through the coaxial light source 130; and reflecting the incident light 132 to the object 120 on the stage 110 through the beam splitter 144.

Figure 6A:
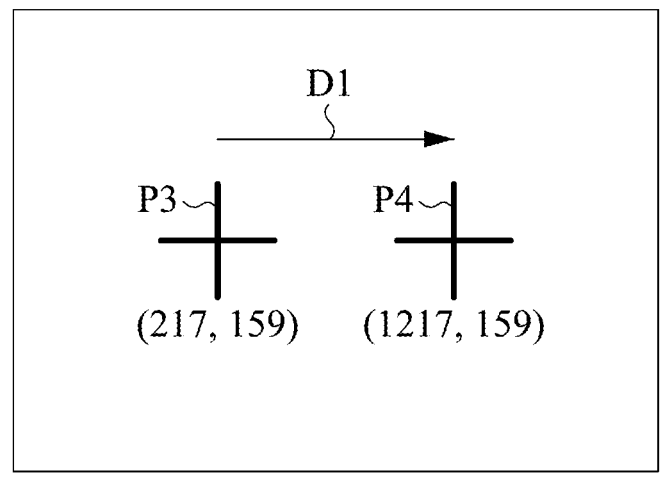
FIG. 6A illustrates a schematic view a third pattern and a fourth pattern are shifted according to one embodiment of the present disclosure.
Figure 6B:
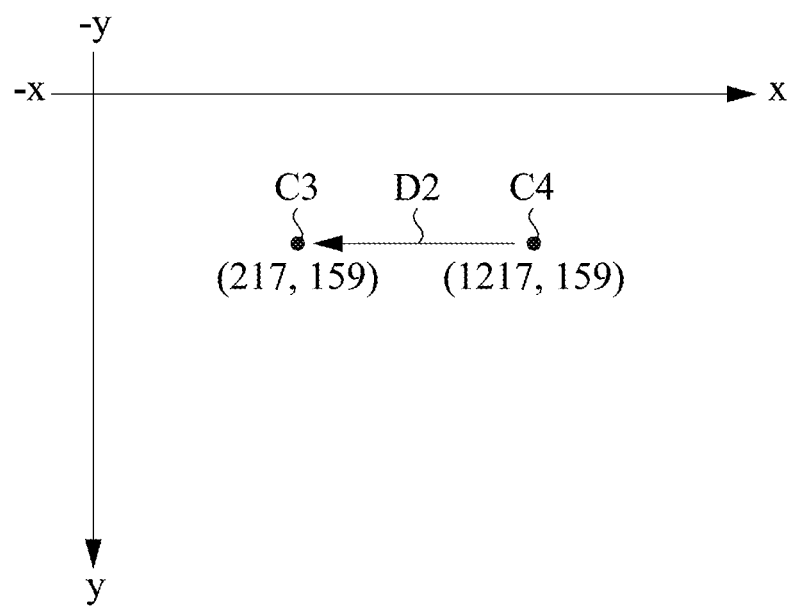
FIGS. 6B, 7 and 8 illustrate schematic views of calibrating a third pattern and a fourth pattern according to some embodiments of the present disclosure.
Figure 7:
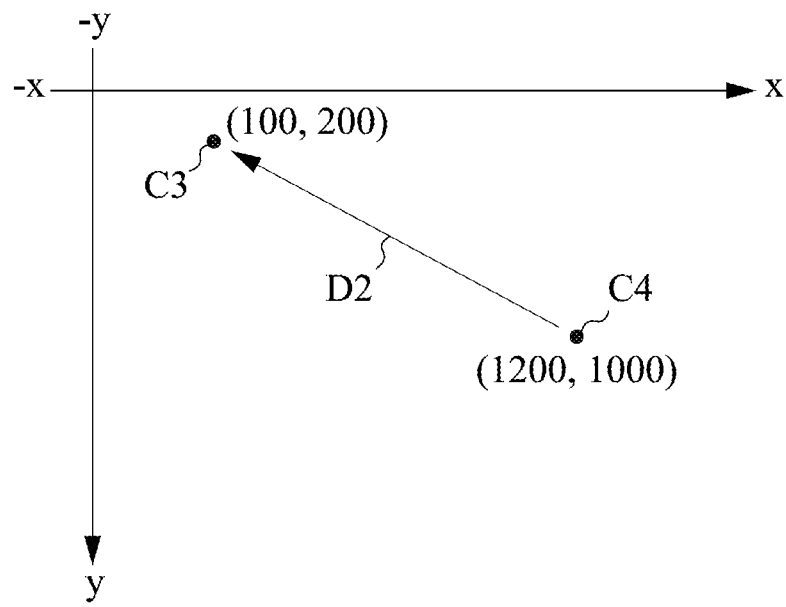
Figure 8:
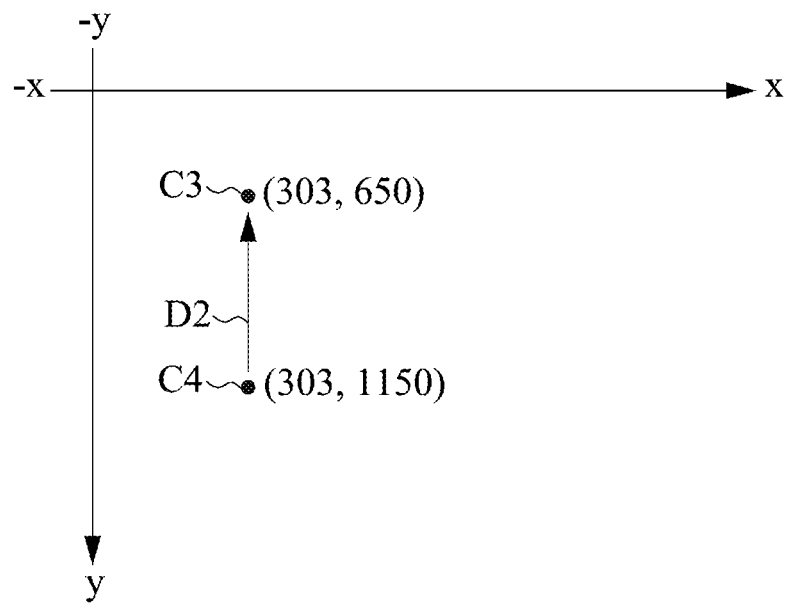

FIG. 6A illustrates a schematic view the third pattern P3 and the fourth pattern P4 are shifted according to one embodiment of the present disclosure. FIGS. 6B, 7 and 8 illustrate schematic views of calibrating the third pattern P3 and the fourth pattern P4 according to some embodiments of the present disclosure. Referring to FIG. 1, FIG. 6A and FIG. 6B, the calibration method further includes determining a first direction D1 from the third pattern P3 to the fourth pattern P4 on the image sensor 150 by the calculation unit 160. For example, the coordinates of the center point C3 may be (217, 159), and the coordinates of the center point C4 may be (1217, 159), so the calculation unit 160 may determine that the first direction D1 is rightward, that is, the stage 110 moves toward the right. In some embodiments, the calibration method further includes moving the stage 110 along a second direction D2 opposite to the first direction D1. That is, the stage 110 may be adjusted to tilt toward the left, so that the normal direction 112 of the stage 110 of the optical measuring device 100 may be parallel to the optical axis a of the imaging lens group 140, so as to improve the measurement accuracy of the optical measuring device 100.

Referring to both FIG. 1 and FIG. 7, the coordinates of the center point C3 may be (100, 200), and the coordinates of the center point C4 may be (1200, 1000), that is, the calculation unit 160 may determine that the stage 110 is tilted downward to the right. Therefore, the stage 110 may be adjusted to tilt toward the second direction D2 (toward upper left direction), so that the normal direction 112 of the stage 110 of the optical measuring device 100 may be parallel to the optical axis a of the imaging lens group 140.

Referring to both FIG. 1 and FIG. 8, the coordinates of the center point C3 may be (303, 650), and the coordinates of the center point C4 may be (303, 1150), that is, the calculation unit 160 may determine that the stage 110 is tilted downward. Therefore, the stage 110 may be adjusted to tilted along the second direction D2 (upward direction), so that the normal direction 112 of the stage 110 of the optical measuring device 100 may be parallel to the optical axis a of the imaging lens group 140.

In summary, the optical measurement device may calculate the tilted angle between the optical axis of the imaging lens group and the normal direction of the stage according to the first distance. Moreover, the optical measurement device may adjust the stage according to the tilted angle. Therefore, the normal direction of the stage of the optical measurement device may be corrected to be parallel to the optical axis of the imaging lens group, which may improve the measurement accuracy of the optical measurement device for measuring the object. The optical measurement device may be used in micron-level measurement systems that require high measurement accuracy.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A calibration method of an optical measurement device, comprising:
    disposing an object on a stage, wherein the object has a top surface and a bottom surface opposite to the top surface, the top surface has a first pattern, and the bottom surface has a second pattern;
    emitting an incident light to the object on the stage, wherein a first light is reflected after the incident light passes through the first pattern, and a second light is reflected after the incident light passes through the second pattern;
    receiving the first light and the second light by an imaging lens group to obtain a third pattern corresponding to the first pattern and a fourth pattern corresponding to the second pattern;
    transmitting the third pattern and the fourth pattern to an image sensor by the imaging lens group, wherein a center point of the third pattern and a center point of the fourth pattern are separated by a first distance on the image sensor;
    calculating a tilted angle between an optical axis of the imaging lens group and a normal direction of the stage according to the first distance; and
    adjusting the stage according to the tilted angle such that the normal direction of the stage is parallel to the optical axis of the imaging lens group.

2. The method of claim 1, further comprising:
    calculating the tilted angle according to a thickness between the top surface and the bottom surface of the object.

3. The method of claim 1, further comprising:
    calculating the tilted angle according a refractive index of the object.

4. The method of claim 1, further comprising:
    calculating the tilted angle according to a magnification of the imaging lens group.

5. The method of claim 4, further comprising:
    calculating a second distance between the first light and the second light according to the first distance, the tilted angle and the magnification.

6. The method of claim 1, wherein emitting the incident light to the object on the stage further comprises:
    emitting the incident light to a beam splitter of the imaging lens group by a coaxial light source; and
    reflecting the incident light to the object on the stage by the beam splitter.

7. The method of claim 1, further comprising:
    determining a first direction from the third pattern to the fourth pattern on the image sensor.

8. The method of claim 7, further comprising:
    moving the stage along a second direction, wherein the second direction is opposite to the first direction.

9. An optical measurement device, comprising:
    a stage;
    an object disposed on the stage, wherein the object has a top surface and a bottom surface opposite to the top surface, the top surface has a first pattern, and the bottom surface has a second pattern;
    a coaxial light source configured to emit an incident light to the object on the stage;
    an imaging lens group located at one side of the coaxial light source and configured to receive a first light reflected by the first pattern and a second light reflected by the second pattern from the incident light to obtain a third pattern corresponding to the first pattern and a fourth pattern corresponding to the second pattern;
    an image sensor located at one side of the imaging lens group facing away from the stage and configured to receive the third pattern and the fourth pattern, wherein a center point of the third pattern and a center point of the fourth pattern are separated by a first distance on the image sensor; and
    a calculation unit electrically connected to the stage and configured to calculate a tilted angle between an optical axis of the imaging lens group and a normal direction of the stage according to the first distance and adjust the stage according to the tilted angle such that the normal direction of the stage is parallel to the optical axis of the imaging lens group.

10. The optical measurement device of claim 9, wherein the imaging lens group has a beam splitter, and the beam splitter is located between the image sensor and the object.

11. The optical measurement device of claim 10, wherein the beam splitter is configured to reflect the incident light to the object on the stage.

12. The optical measurement device of claim 9, wherein the object is located between the stage and the imaging lens group.

13. The optical measurement device of claim 9, wherein the object has a thickness between the top surface and the bottom surface, and the calculation unit is further configured to calculate the tilted angle between the optical axis of the imaging lens group and the normal direction of the stage according to the thickness.

14. The optical measurement device of claim 9, wherein the object has a refractive index, and the calculation unit is further configured to calculate the tilted angle between the optical axis of the imaging lens group and the normal direction of the stage according to the refractive index of the object.

15. The optical measurement device of claim 9, wherein the imaging lens group has a magnification, and the calculation unit is further configured to calculate the tilted angle between the optical axis of the imaging lens group and the normal direction of the stage according to the magnification of the imaging lens group.

16. The optical measurement device of claim 15, wherein the calculation unit is further configured to calculate a second distance between the first light and the second light according to the first distance, the tilted angle and the magnification.

17. The optical measurement device of claim 9, wherein the calculation unit is further configured to determine a first direction from the third pattern to the fourth pattern on the image sensor.

18. The optical measurement device of claim 17, wherein the stage is further configured to move along a second direction opposite to the first direction.

19. The optical measurement device of claim 9, wherein an included angle between the incident light and the first light is twice the tilted angle.

* * * * *